United States Patent [19]
Betz

[11] Patent Number: 5,335,746
[45] Date of Patent: Aug. 9, 1994

[54] ELECTROMAGNETIC CLUTCH DRIVEN STEERABLE AXLE

[75] Inventor: Michael A. Betz, Huxley, Iowa

[73] Assignee: Sauer Inc., Ames, Iowa

[21] Appl. No.: 5,452

[22] Filed: Jan. 19, 1993

[51] Int. Cl.$^5$ .......................... B62D 7/14; B60K 23/04
[52] U.S. Cl. ..................................... 180/248; 180/140;
180/233; 180/242; 180/305
[58] Field of Search ............... 180/248, 242, 305, 140,
180/233, 247; 192/82 T, 84 A; 364/424.1;
475/150; 280/91, 99

[56] References Cited

U.S. PATENT DOCUMENTS

| | | |
|---|---|---|
| 4,662,499 | 5/1987 | Jordan . |
| 4,723,624 | 2/1988 | Kawasaki et al. . |
| 4,733,577 | 3/1988 | Griesser et al. . |
| 4,781,078 | 11/1988 | Blessing et al. . |
| 4,909,344 | 3/1990 | Mueller et al. . |
| 4,937,750 | 6/1990 | Gilliam . |
| 4,989,686 | 2/1991 | Miller et al. . |
| 5,007,498 | 4/1991 | Wiese et al. .......................... 180/249 |
| 5,030,181 | 7/1991 | Keller . |
| 5,161,636 | 10/1990 | Haupt . |

FOREIGN PATENT DOCUMENTS

| | | | |
|---|---|---|---|
| 318688 | 6/1989 | European Pat. Off. ............ | 180/248 |
| 235131 | 9/1986 | Japan .................................. | 180/248 |
| 262264 | 10/1989 | Japan .................................. | 180/248 |

*Primary Examiner*—Mitchell J. Hill
*Attorney, Agent, or Firm*—Zarley, McKee, Thomte, Voorhees & Sease

[57] ABSTRACT

An electromagnetic clutch driven steerable drive axle system for a four-wheel drive vehicle, such as a front mount mower, including a rotary power source, a driven front axle, a mechanical rear axle converting power from the rotary power source into tractive power at a set of wheels attached thereto, a steering mechanism connected to the rear wheels, an electromagnetic clutch between the power source and mechanical rear axle, and a transducer which provides input representative of the turning and/or tractive power status of the mower to a microprocessor which may send current to the clutch. Having a plurality of frictional clutch disks, the clutch selectively transmits driving power to the secondary axle based on input current applied by the microprocessor. With the disks separated, the rotary power source and steerable axle are uncoupled. The rear wheels are allowed to freewheel, reducing skidding during turns in forward and reverse. Various embodiments are possible using known transducers for monitoring system parameters. The microprocessor compares these parameters to predetermine values and bases the input current to the clutch on them. The availability of four-wheel drive may be controlled by microprocessor logic and preloading of the clutch disks, either mechanically (with springs) or electromagnetically. Electrical preloading of the clutch enables vehicle torque to be intensified when additional tractive power is required.

14 Claims, 5 Drawing Sheets

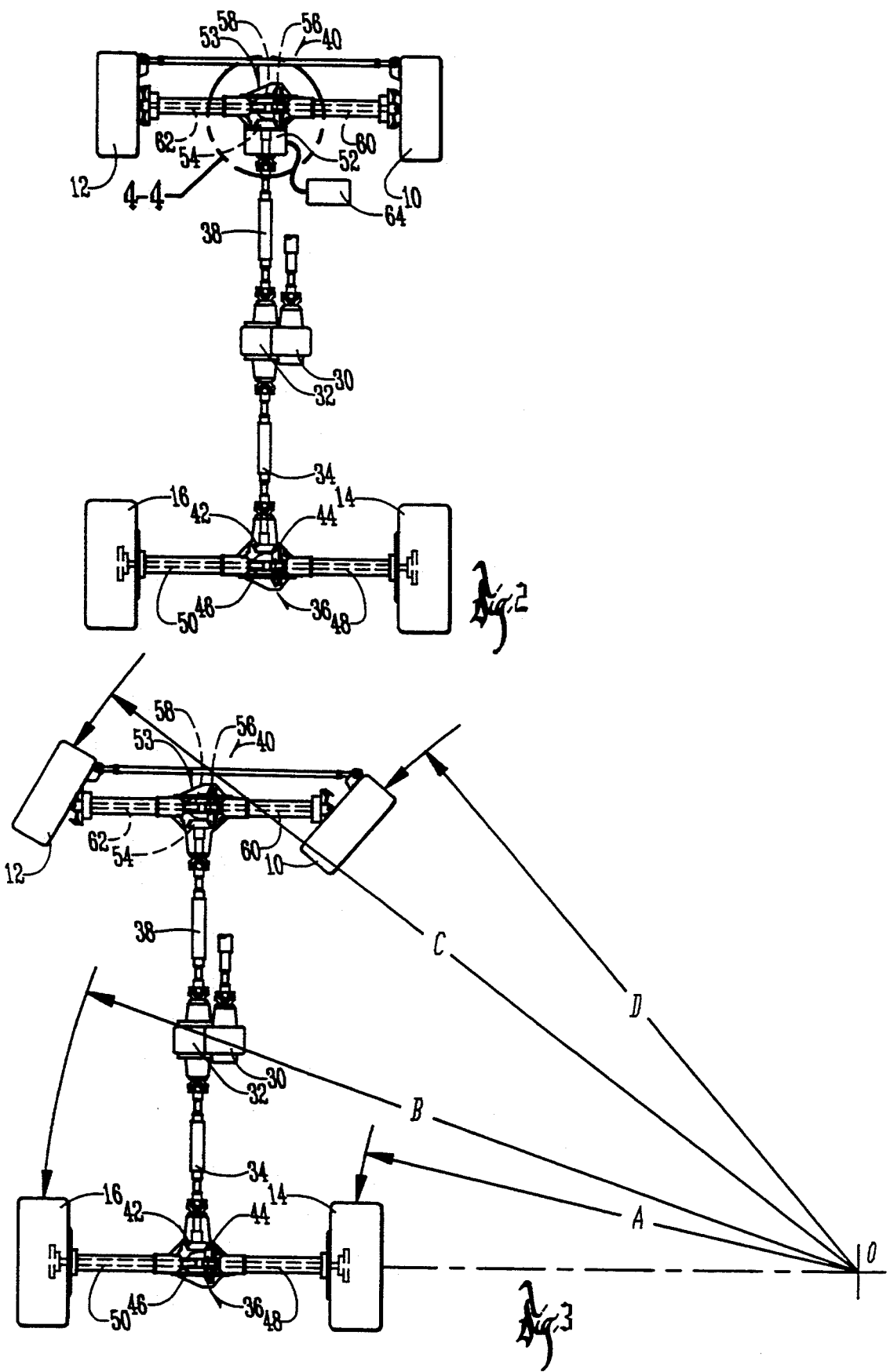

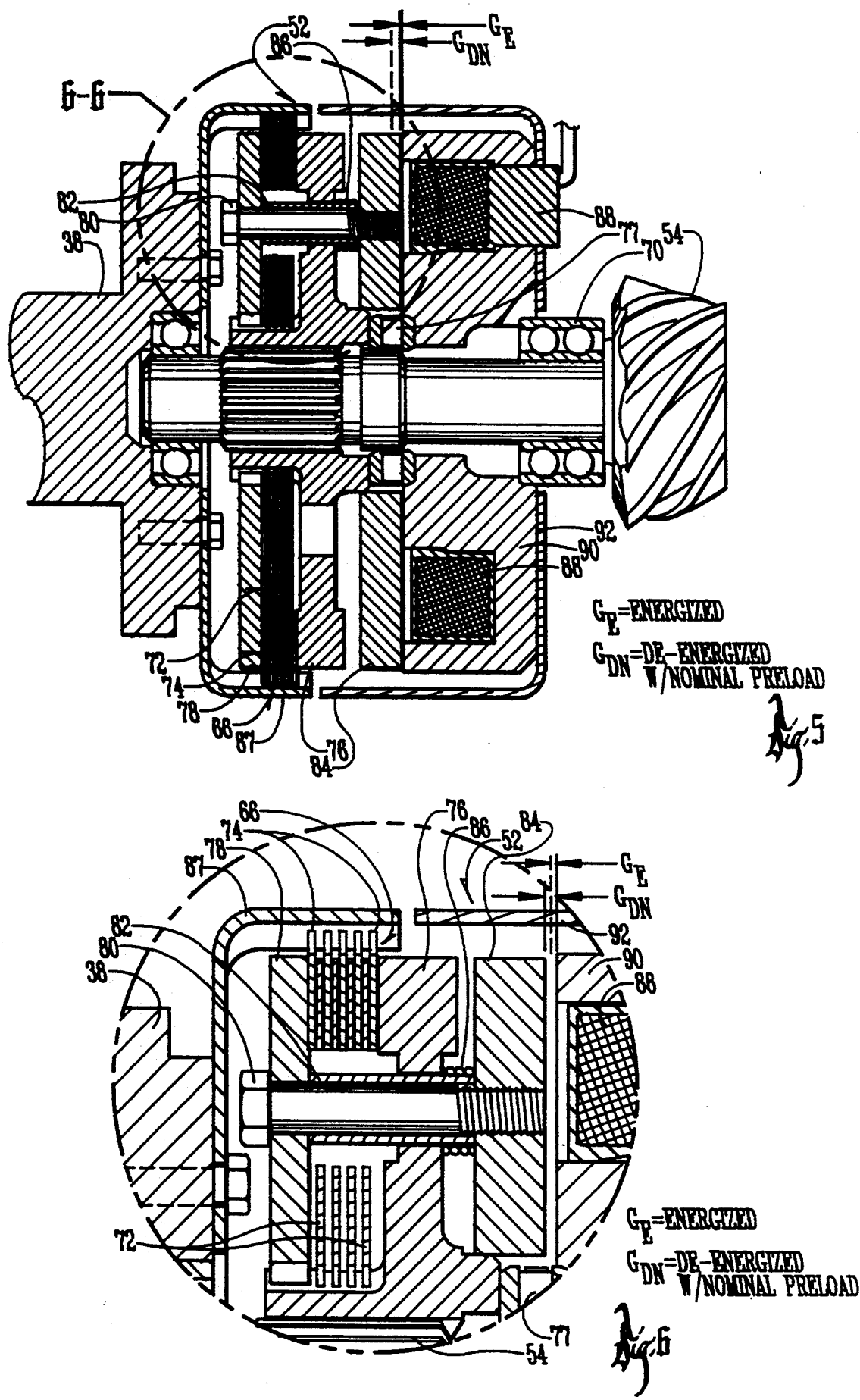

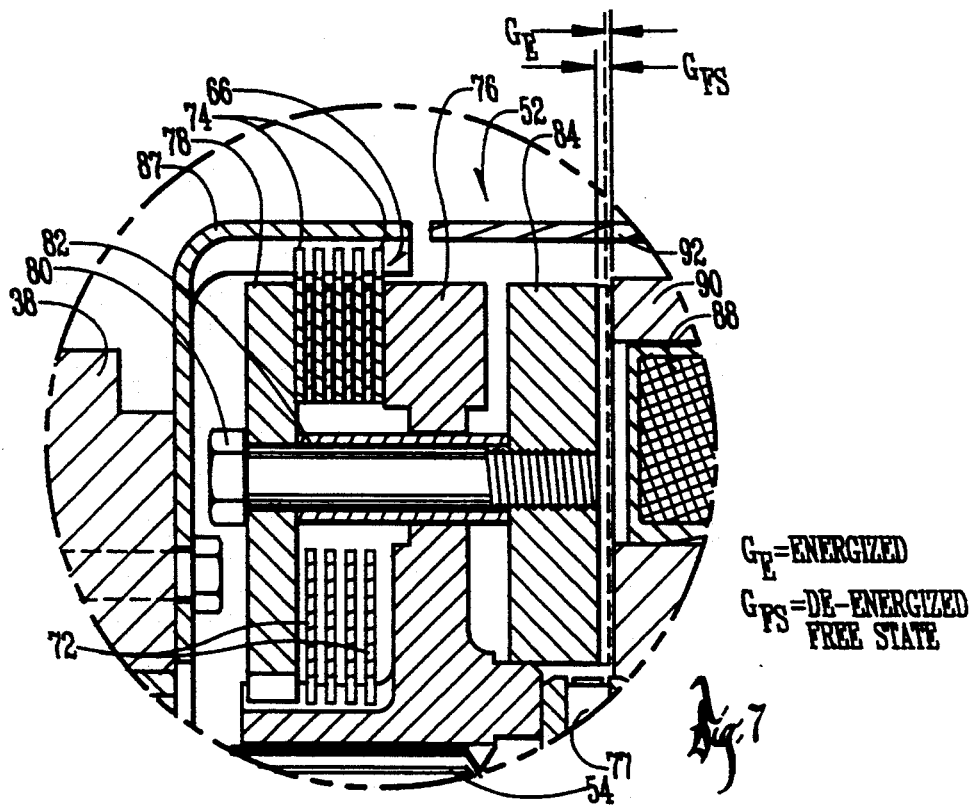
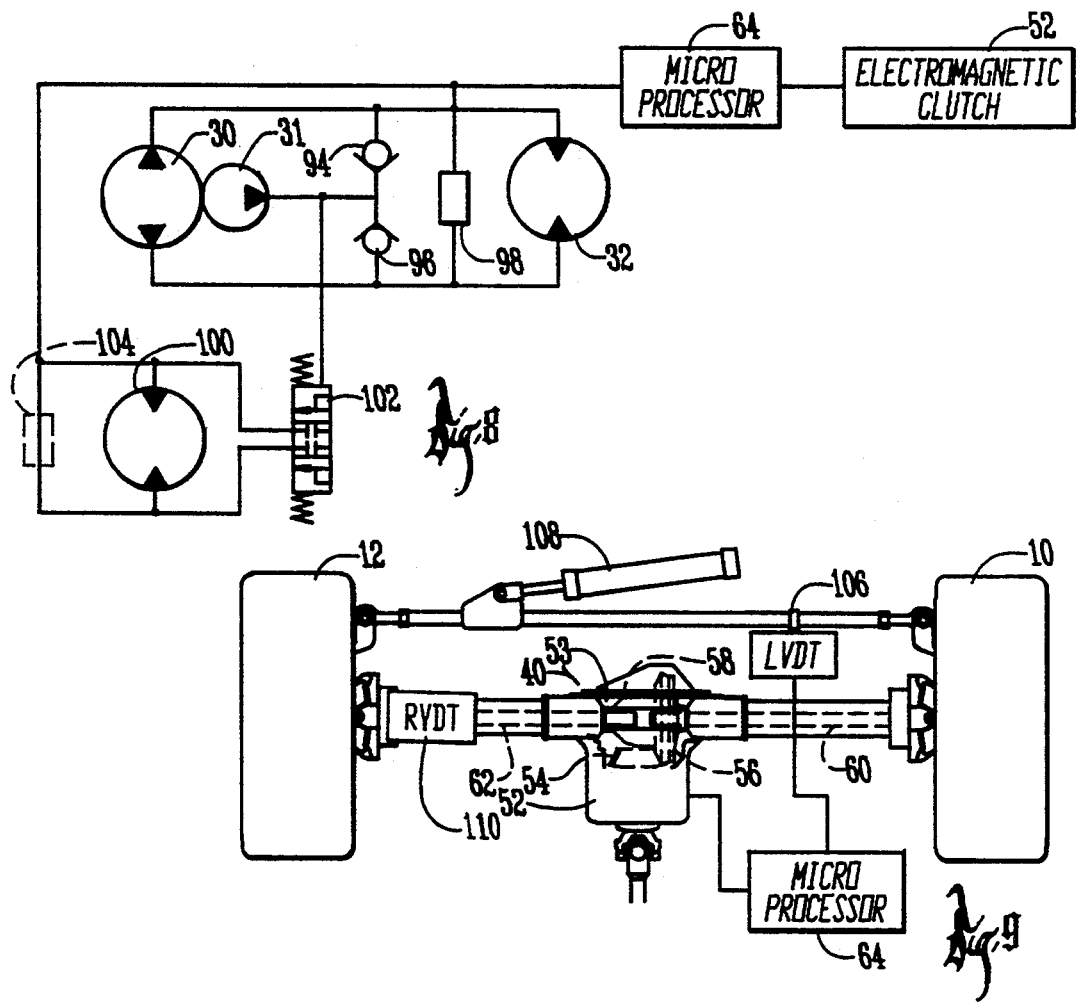

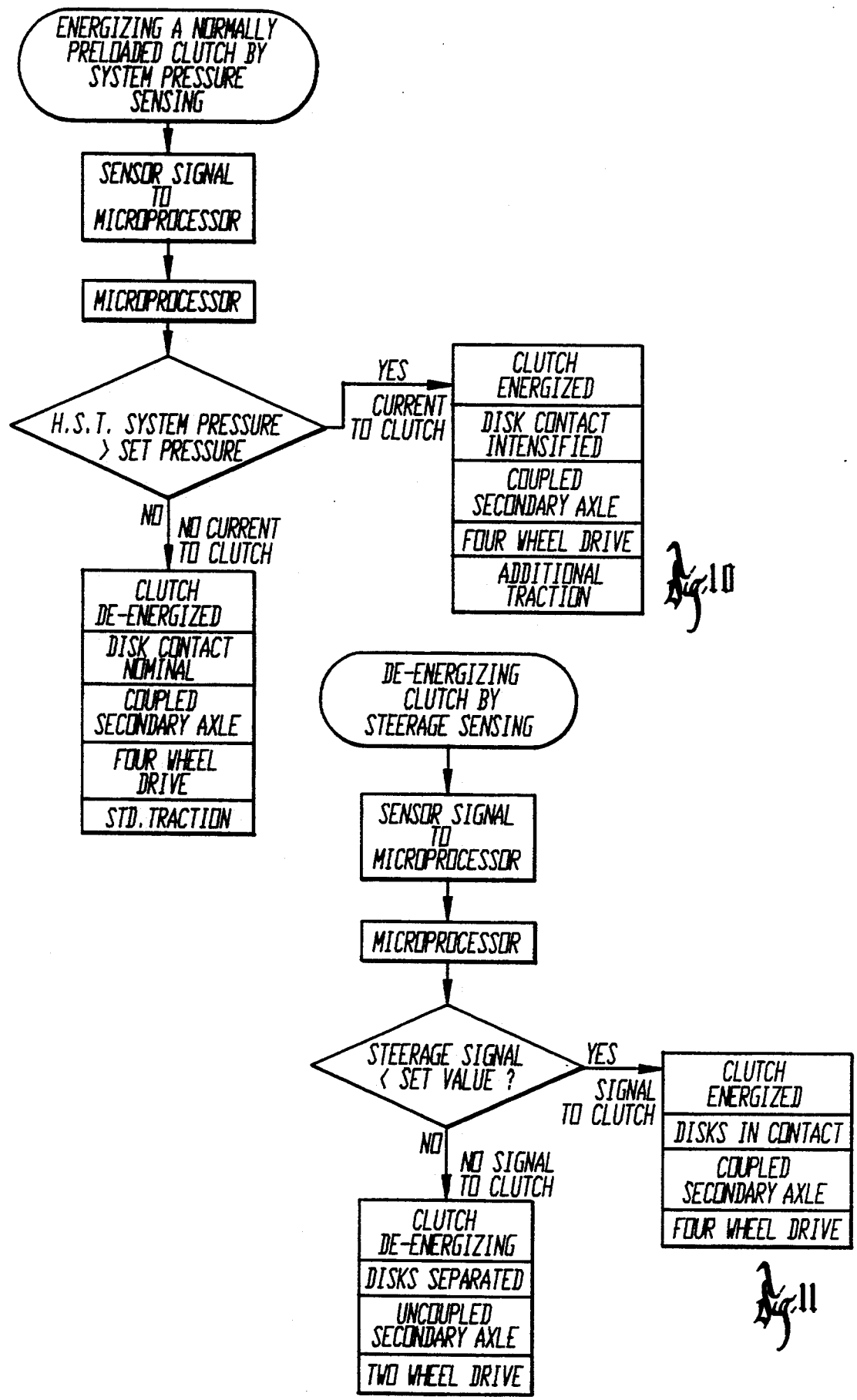

ELECTROMAGNETIC CLUTCH DRIVEN STEERABLE AXLE

BACKGROUND OF THE INVENTION

The present invention relates to a means for controlling the torque transmitted to a rigid steerable axle in a vehicle. More particularly, the invention controls the torque input to the steerable axle of a four-wheel drive (hereinafter, 4WD) front mount mower to minimize mismatched wheel speeds, skidding, and resulting damage to the turf. The advantages of this invention, however, are believed to be applicable to almost any vehicle driven by multiple axles.

A conventional vehicle drive train often includes a prime mover, such as an internal combustion engine, powering one or two wheels through a transmission and final drive axle. On off-road vehicles, like tractors and mowers, the combination of a hydrostatic transmission (hereinafter HST) and transaxle final drive is an alternative drive train configuration which is known to give greater variability of torque and vehicle speed than geared mechanical transmissions.

In many applications gradeability is a concern. Gradeability is the ability of the vehicle to traverse a grade or hill. Since the gradeability of a vehicle is generally limited by the tractive capability of its drive wheels, some vehicle makers have sought to increase gradeability by powering additional drive wheels. As a result, 4WD vehicles have become commonplace.

In a 4WD vehicle, the steering axle serves as a second source of drive power to enhance tractive capability. Power driven steerable axles are known and widely used on farm tractors. These tractors typically have a hydraulically operated clutch in the main transmission which selectively engages an external drive shaft to power the steerable axle wheels through a bevel gear and differential in the axle. Unfortunately, when the clutch is disengaged, the external drive shaft is still connected to the axle and wheels. Thus, the inertia of the external drive shaft can interfere with free rotation of the wheels and can cause them to skid.

Many 4WD cars and trucks have clutches to selectively supply power to secondary steerable axle wheels. However, such steerable axles are typically not rigid. These vehicles typically have external drive shafts extending from a center differential to independently suspended front wheel assemblies. Depending on the location of the clutch, such vehicles may also experience wheel skidding problems.

Because of their particular applications, wheel skidding is a big concern in front mount mowers. These mowers are frequently used for turf care at golf courses, country clubs, estates and the like. Where the unblemished appearance of the turf or grass is such a high priority, wheel skidding must be minimized. When the wheels skid they cease to roll freely, instead they slide across the ground. The tires tend to tear up the turf as they slide across it.

Traditionally, front mount mowers were two wheel drive vehicles. The drive wheel(s) were powered by an engine though a hydrostatic transmission connected to a front or primary transaxle. As the name indicated, the mowing deck was mounted at the front of the vehicle. Seeking better gradeability, some manufacturers have attempted to incorporate 4WD into their front mount mowers. In one 4WD system the steerable rear wheels are powered at a fixed ratio by the power takeoff (hereinafter, PTO) shaft of the same HST that drives the front wheels. As illustrated in FIG. 3, this presents a problem during turning of the mower.

As the highly maneuverable mower swings around a theoretical point of rotation O, due to the relative curvatures or radii of wheel paths A, B, C, D, the speed required of the outer rear wheel 10 is greater than the inner rear wheel 12 and both rear wheels must be going faster than the corresponding front wheels 14 and 16 to prevent skidding. The larger the radius of curvature for the path, the greater speed the wheel must travel to maintain that path. If the wheel is driven at a relatively constant speed and more speed is demanded to negotiate a turn, the wheel cannot keep pace and will slip or drag on the turf causing damage to the grass. Higher turn angles or sharper turns cause greater proportional mismatches in wheel speeds. Using spider gears in the axle is known to reduce inner/outer wheel speed mismatches, but front/back mismatches remain a persistent problem. If 4WD is to be achieved by powering the rear wheels at a fixed ratio relative to the front drive wheels, the resulting mismatch in actual versus required wheel speed during a turn will cause the rear wheels to skid and damage the turf.

If a clutch in the main transmission were used, the inertia of the required external drive shaft would contribute to wheel skidding and turf damage. Placing a device known in the prior art as a freewheeling or overrunning clutch between the drive shaft and the bevel pinion shaft of the steerable axle could reduce the inertia and skidding problem in the forward direction. However, because of the way those clutches operate, loss of tractive capability may still occur in the reverse and braking modes of operation.

Therefore, it is the primary objective of this invention to provide an electromagnetic clutch driven rigid steerable axle for a 4WD system which reduces wheel skidding during turns.

A further objective of this invention is to provide a steerable drive axle system which provides some driving power to the steerable wheels automatically when other wheels are driven, yet allows the steerable wheels to overrun through turns, and as otherwise needed, to avoid wheel skidding and turf damage.

A further objective of this invention is to provide a steerable drive system which allows the steerable wheels to overrun in both the forward and reverse directions.

A further objective of this invention is to provide a steerable drive system for a 4WD front mount mower, tractor or the like which reduces wheel skidding.

A further objective of this invention is to provide a clutch for a steerable drive system which transmits additional power to the steerable axle when commanded.

A further objective of this invention is to provide a steerable drive system wherein a sensor sends a signal representing HST system pressure to an electronic control means which actuates an electromagnetic clutch to provide additional grade ascending power to the steerable axle when a predetermined HST system pressure is exceeded.

These and other objectives will be apparent from the following description of the invention.

SUMMARY OF THE INVENTION

The present invention is an electromagnetic clutch driven steerable drive axle system for a four-wheel drive vehicle, such as a front mount mower, including a source of rotary input power, a primary axle, a mechanical secondary axle converting power from the rotary input power source into tractive power at a set of secondary wheels attached thereto, a mechanism for steering connected to the set of secondary wheels, an electromagnetic clutch assembly operatively interconnected between the power source and mechanical secondary axle, and a sensing means which provides input to an electronic control which may energize or de-energize the clutch.

Having a plurality of frictional clutch disks, the clutch selectively transmits driving power to the secondary axle based on input current applied by the electronic control. With the clutch disks separated, the rotary power source and steerable secondary axle are uncoupled. The secondary wheels are allowed to overrun or freewheel during turns in both the forward and reverse directions such that skidding is reduced.

The sensing means may be of a type to monitor mechanical indications of the steering or turning of the vehicle (LVDT or RVDT) or pressure indications (steering motor pressure or hydrostatic transmission system pressure).

The position of the clutch disks may be changed by the operator or automatically in a variety of ways. In one automatic mode, hydrostatic transmission system pressure is sensed and signalled to an electronic control when the pressure exceeds at preset value indicative of additional tractive power being required. This might occur when the mower is ascending a steep grade. The electronic control applies current to the electromagnetic clutch. The disks are forced closer together, rotably coupling the power source and steerable axle to transmit more driving power. In this manner, "normally off" four wheel drive is automatically turned "on" as the conditions demand.

Alternatively, the clutch disks may be mechanically preloaded (with zero current applied to the clutch) so as to be coupled with the power source and steerable axle up to a nominal torque value based on wheel slip and the differential ratio. As long as torque required by the rear wheels translates through the differential into a value less than the nominal preloaded value, the clutch disks automatically remain forced together to couple the rotary power source and steerable axle. Thus, additional tractive power is supplied to the secondary wheels under most operating conditions. In other words, the four wheel drive is "normally on". When the preload value is exceeded, the clutch disks automatically slip and the secondary wheels are able to overrun or freewheel during turns, thereby reducing skidding and turf damage.

BRIEF DESCRIPTION OF THE DRAWINGS

FIG. 2 is a top view pictorial drawing showing the drive train components for the front mount mower of FIG. 1.

FIG. 3 is a top view pictorial drawing showing the theoretical curvature followed by the wheels of a front mount mower during a turn.

FIG. 5 is a section view taken along line 5—5 of FIG. 4 showing the components of the electromagnetic, spring-preloaded clutch in their electrically energized condition.

FIG. 6 is an enlarged view of area 6—6 in FIG. 5 showing the condition of the clutch plates when the clutch is electrically de-energized.

FIG. 7 is an enlarged view similar to FIG. 6 showing the de-energized state of a clutch without preloading springs.

FIG. 8 is a hydraulic schematic diagram showing a control system for the clutch driven steerable rear axle of this invention.

FIG. 9 is a top view pictorial diagram showing a steering mechanism and steer sensor which can be utilized in conjunction with the clutch driven steerable rear axle of this invention.

FIG. 10 is a flow diagram illustrating the operation of the spring-preloaded electromagnetic clutch driven steerable rear axle of this invention when system pressure sensing is used to control the clutch.

FIG. 11 is a flow diagram illustrating the operation of the electromagnetic clutch driven steerable rear axle of this invention when steer sensing is used to control the clutch.

DETAILED DESCRIPTION OF THE PREFERRED EMBODIMENT

Figure 1:
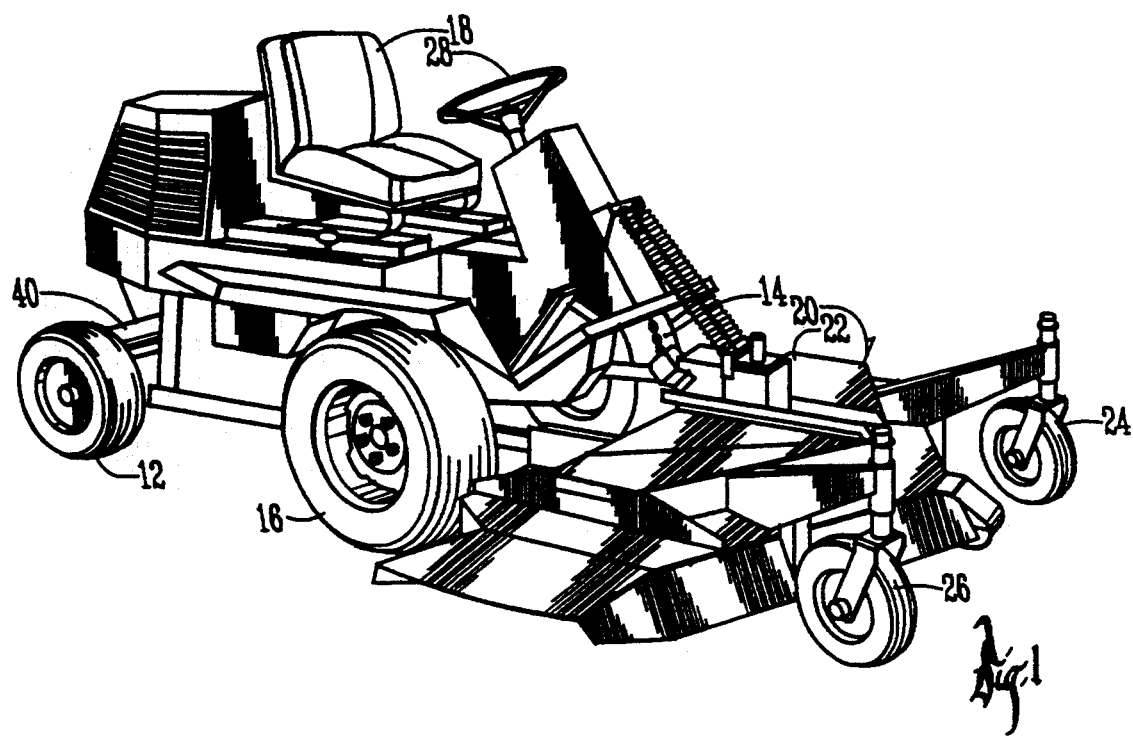
FIG. 1 is a perspective view of a front mount mower having the present invention.

FIG. 1 shows a typical front mount mower 20 to which the present invention is well suited. The mower deck 22 is mounted in front of wheels 10, 12, 14, 16, and centrally located operator seat 18. For quicker turning response, steerable rear wheels 10 and 12 are usually smaller in diameter than front wheels 14 and 16. Auxiliary deck wheels 24 and 26 are mounted to the front of mower deck 22 for its support, but are not driven. The operator steers the vehicle by conventional steering wheel 28. A conventional engine (not shown), whose location is not critical to this invention, is typically behind and beneath seat 18.

The drive train of a front mount mower 20 having the clutch driven steerable rear axle of the present invention is pictured in FIG. 2. Pump 30, preferably of the hydrostatic type, is drivingly coupled to a conventional engine (not shown). Pump 30 is hydraulically connected to motor 32, also preferably of the hydrostatic type. A front drive shaft 34 drivingly connects the motor 32 to front axle assembly 36. Similarly, rear drive shaft 38 connects the motor 32 to the clutch driven steerable rear axle assembly 40. The mower is supported and driven by the rotation of wheels 10, 12, 14 and 16, which are connected to the ends of axles 36 and 40.

Front axle assembly 36 is of conventional construction having a bevel pinion shaft 42, bevel ring gear 44 and spider gear 46 for transmitting power to laterally extending front axle shafts 48 and 50.

Figure 4:
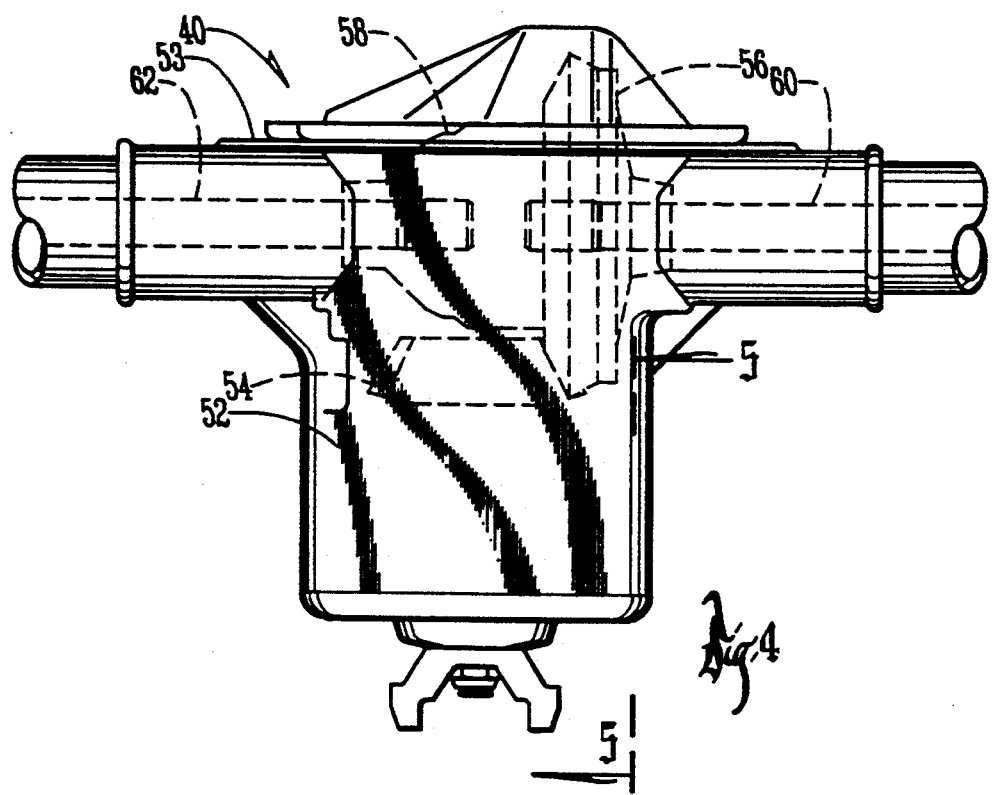
FIG. 4 is an enlarged top view, removed from area 4—4 in FIG. 2, of the electromagnetic clutch driven steerable rear axle of the present invention.

As best shown in FIG. 4, the clutch driven steerable rear axle assembly 40 of this invention combines an electromagnetic clutch 52, preferably in the same housing 53 and sharing the same lubricating fluid, with beveled pinion shaft 54, bevel ring gear 56 and spider gear 58 to selectively transmit power to laterally extending rear axle shafts 60 and 62. Electronic microprocessor control 64 is operatively connected to the electromagnetic clutch 52 to selectively engage and disengage a plurality of clutch plates 66 shown in greater detail in FIG. 5. Based on their relative position, clutch plates 66 selectively allow torque or power to be transmitted through the clutch driven steerable rear axle 40 to the wheels.

As shown in FIG. 5, bevel pinion shaft 54 is supported by bearings 68 and 70 at its ends. Clutch plates 66 include an inner disk assembly 72 and an outer disk assembly 74. Beveled pinion shaft 54 is in splined engagement with an inner disk assembly 72. The inner disk assembly 72 includes a plurality of inner clutch disks trapped in a spaced-apart fashion between rotary base 76 and top plate 78. An array of bolts 80 in a circular pattern extend through the inner disk assembly 72 and bushings 82 to secure the assembly and attach it to ferromagnetic plate 84. Rotary base 76 is further supported and spaced from stationary components by thrust bearing 77. Activating springs 86 are of the coil type and surround bushings 82 between the rotary base 76 and ferromagnetic plate 84. FIG. 5 shows a spring 86 in its extended position. In this position, the inner disk assembly 72 is preloaded or compressed together thereby reducing the spacing between the inner clutch disks. Referring to FIG. 6, an outer disk assembly 74 is attached to rear drive shaft 38 and extends around the circumference of the inner disk assembly 72. Complimentary outer clutch disks are attached to normally rotating casing 87 in a spaced-apart fashion and extend inwardly to be interposed between the inner clutch disk assembly 72 which extends beyond bolts 80. FIG. 5 shows that the electromagnetic clutch 52 also includes an electromagnet 88 which is secured in a base 90 and surrounded by stationary casing 92.

The operation of the electromagnetic clutch 52 can be understood from FIGS. 5 and 6. When the electromagnet 88 is energized, the clutch will assume the condition shown in FIG. 5. The ferromagnetic plate 84 will be pulled toward magnet base 90, thereby reducing the gap between them from the nominal state indicated by $G_{DN}$ to the energized state $G_E$ and clamping together disks 72 and 74. Rotary base 76 is assembled between top plates 78, springs 86, and ferromagnetic plate 84 such that the springs provide a nominal preload or clamping force on the clutch disk assemblies 72 and 74 which is intensified by the electromagnetic force from magnet 88. Bevel pinion shaft 54 is attached to rotary base 76. The rotary base 76 is attached to inner clutch disks 72 so that when the disk assemblies 72 and 74 are clamped together, bevel pinion shft 54 will rotate as one with them. Therefore, with the magnet 88 energized, electroclutch 52 can transmit increased or intensified power to the rear axle through bevel pinion shaft 54. In other words, the vehicle is in maximum or intensified four wheel drive (4WD).

FIG. 6 shows the clutch with the electromagnet de-energized. Now only springs 86 clamp disks 72 and 74 together under a nominal preload. A de-energized nominal gap $G_{DN}$ occurs between ferromagnetic plate 84 and magnet base 90. When outer clutch disks 74 and inner clutch disks 72 are nominally clamped together, both disk assemblies and the bevel pinion shaft rotate together, thereby transmitting rotational power to the mechanical portion of the rear axle. In this condition, the vehicle operates with standard 4WD.

The de-energized, nominally preloaded clutch condition is particularly useful in preventing skidding or loss of tractive capability during sharp turns. During such turns, the rear wheels will demand more torque than can be transmitted through the de-energized clutch and differential. When the preload clamping force is overcome by the torque demanded, clutch disk assemblies 72 and 74 will slip relative to each other. When the clutch disks slip or disengage, the rear wheels overrun or freewheel so that they do not skid across the turf. The force of springs 86 can be predetermined for a given application. The preload affected by springs 86 is determined and limited by the amount of torque that is necessary to skid the rear wheels. For example, if the torque necessary to skid the rear wheels is 100 ft-lbs and the ratio through the bevel gear mesh is 1:4 the maximum amount of preload in the clutch must be some value less than 25 ft-lbs.

ALTERNATE CLUTCH-LOADING EMBODIMENT

FIG. 7 shows the electromagnetic clutch 52 without springs for preloading the inner disk assembly 72. In a de-energized free state a Gap $G_{FS}$ exists between ferromagnetic plate 84 and magnet base 90. The clutch disks 72 and 74 do not engage each other in this position. As a result the bevel pinion shaft does not transmit tractive power to the rear axle. The vehicle is in two wheel drive (2WD).

When electromagnet 88 is energized a gap $G_E$ results between plate 84 and base 90. The electromagnetic force loads the inner disk assembly as previously described with respect to FIG. 5. The current may be varied to establish a different gap clamping force or load on the inner disk assembly 72. Depending on the current supplied to electromagnet 88, different degrees of clutch engagement are possible. Total engagement provides maximum intensified tractive power for 4WD. Basically, the greater the current, the smaller the gap. The smaller the gap, the greater the clamping load on the clutch plates, and the more tractive power is intensified. Additional tractive power is particularly useful when ascending a slope.

ALTERNATE SENSING MEANS

Current for the electromagnetic clutch may be provided in a variety of ways to engage or disengage the clutch when certain conditions are sensed. In FIG. 8, a conventional hydraulic pump 30 having a charge pump 31 is connected in a closed circuit with hydraulic motor 32. Check valves 94 and 96 ensure proper directional flow and allow charge pump 31 to add fluid to the low pressure side of the circuit to replenish losses. Microprocessor 64 controls the current sent to the electromagnetic clutch 52. Microprocessor 64 is capable of receiving electrical signals from a variety of sensing means.

System Pressure Sensing

Hydrostatic system pressure sensing is a useful means of controlling the electromagnetic clutch of this invention. One sensing means consists of a system pressure transducer 98 placed between the high pressure and low pressure sides of the closed circuit. Transducer 98 senses the pressure differential and sends a representative electrical signal to the microprocessor 64. Microprocessor 64 compares the signal to a preset value. When a preset value is exceeded, microprocessor 64 sends current to energize electromagnetic clutch 52 and intensify the clamping of its disks. The rear axle will be engaged and maximum tractive effort will be available with 4WD. Sensing in this manner is useful because hydrostatic transmission system pressure increases when the vehicle is ascending or descending a steep grade. FIG. 10 summarizes, in flow diagram form, the energizing of the electromagnetic clutch by system pressure sensing. In this arrangement, the clutch automatically provides additional tractive power when system pressure exceeds a predetermined value.

Steer Sensing

An alternate sensing arrangement is shown within the dotted line box in FIG. 8. This sensing method operates in conjunction with the steering mechanism 108 at the rear wheels of the vehicle. As shown in FIG. 9, the rear wheels 10 and 12 may be steered hydraulically by pumping fluid to a bidirectional steering motor 100. In FIG. 8, charge pump 31 supplies fluid to steering motor 100. The direction of the motor and therefore the direction of the turn is established by steer control valve 102. A steering pressure transducer 104 senses the pressure differential between the inlet and exhaust sides of the steering motor 100 and sends a representative electrical signal to the microprocessor 64.

FIG. 9 shows another sensing arrangement. A linear variable displacement transducer (LVDT) senses linear movement of the steering mechanism on the vehicle and sends representative signals to the microprocessor. FIG. 9 shows LVDT 106 attached to the mechanical portion of the rear wheel steering mechanism 108 of front mount mower 20. Based on the sharpness of the turn encountered, the LVDT 106 sends a signal to the microprocessor 64 for comparison to a preset value.

A similar device known as a rotary variable displacement transducer (RVDT 110) could be attached to a part of the steering mechanism which rotates rather than moves linearly during a turn. The RVDT (not shown) sends signals representative of angles of rotation to the microprocessor.

The flow diagram of FIG. 11 summarizes the de-energizing of the electromagnetic clutch of FIG. 7 by steer sensing. The same principles may also be applied to the nominally preloaded clutch of FIG. 6. During sharp turns the steer sensing signal received by the microprocessor may exceed the preset value. If so, the microprocessor control 64 will de-energize the clutch 52. No current to the magnet results in no clamping load on the clutch plates, so they return to their free state gap $G_{FS}$. The clutch will slip or disengage automatically to allow the rear wheels to freewheel or overrun to avoid skidding. Thus, the vehicle is shifted from 4WD to 2WD as turning conditions demand to prevent skidding.

Therefore, it can be seen from the above that the present invention accomplishes its objectives.

What is claimed is:

1. In a powered, four-wheeled vehicle having a primary axle for propulsion, a secondary axle system for drive and steering comprising:
   a source of rotary input power;
   a mechanical secondary axle for receiving rotary power from said source and converting said rotary power to tractive power for at least one wheel of a set of wheels mounted to the ends of said axle;
   a mechanism for steering connected to said set of wheels;
   a steer sensing means operatively connected to said steering mechanism, such that a signal representative of the turning angle of said vehicle is generated;
   a control means for receiving said steer signal and controlling an electrical current output by said control when said steer signal received exceeds predetermined limits; and
   an electromagnetic clutch assembly attached to said secondary axle and operatively connected to said control and power source wherein said clutch assembly, based on said current output from said control, selectively transmits driving power from said power source to said axle to vary the power transmitted to said set of wheels and thereby the tractive capability of the vehicle in both the forward and reverse directions of movement.

2. The steerable secondary axle system of claim 1 wherein said clutch assembly and said mechanical secondary axle comprise one integrated assembly having a common housing and a common lubricated fluid.

3. The steerable secondary axle system of claim 2 wherein said secondary axle is rigid and includes a pair of coaxial final drive shafts, each extending outwardly toward a wheel.

4. The steerable secondary axle system of claim 1 wherein said clutch assembly includes a plurality of disks preloaded to remain in operative engagement between said secondary axle and power source to transmit nominal four wheel driving power under normal circumstances, but to intensify driving power to said axle from said power source whenever said control supplies current and return driving power to said nominal level when said control means supplies zero current such that said preloaded clutch disks can slip into disengagement from said axle to prevent skidding or loss of tractive capability during turns.

5. The steerable secondary axle of claim 4 wherein said clutch disks are preloaded in engagement by one or more coiled springs.

6. The steerable secondary axle system of claim 1 wherein said control is electronic and applies current to said electromagnetic clutch assembly which includes a plurality of disks free of mechanical preloading, whereby when the applied current increases or decreases more or less electromagnetic force is exerted on said disks to increase or decrease the driving power transmitted to said secondary axle and wheels.

7. The steerable secondary axle system of claim 1 wherein said rotary power source is connected by an external drive shaft to said clutch assembly and said secondary axle includes a bevel pinion shaft and said clutch assembly is directly connected to said pinion shaft, whereby said axle is free of the rotational energy of the external drive shaft when said clutch slips or uncouples said axle from said rotary power source such that the tendency of the vehicle wheels to skid during turns is reduced.

8. The steerable secondary axle system of claim 1 wherein said steer sensing means is a linear variable displacement transducer (LVDT).

9. The steerable secondary axle system of claim 1 wherein said steer sensing means is a rotary variable displacement transducer (RVDT).

10. The steerable secondary axle system of claim 1 wherein said mechanism for steering is hydraulically assisted by a source of fluid pressure connected to a bidirectional hydraulic steering motor, which is operatively connected to said mechanism for steering, for converting said fluid pressure into a steering force, thereby turning said set of wheels and said vehicle; and said steer sensing means comprises a pressure transducer operatively connected to said steering motor and said control for generating to said control a signal representative of the degree of turning of said vehicle by sensing the pressure at said steering motor.

11. In a powered four-wheeled vehicle having a front axle for propulsion connected by a closed-circuit hydrostatic transmission to a source of rotary power, a rear axle system for drive and primary steering, comprising:

a pair of rear wheels;

a mechanical rear axle drivingly connected to said hydrostatic transmission and said rear wheels for transmitting tractive power to said rear wheels;

a mechanism for steering connected to said rear wheels;

an electromagnetic clutch assembly operatively interconnecting said hydrostatic transmission and mechanical rear axle, wherein said electromagnetic clutch selectively transmits driving power from said power source to said rear axle to vary the power transmitted to said rear wheels and thereby the tractive capability of the vehicle in both the forward and reverse directions of movement;

said electromagnetic clutch having a plurality of disks whose faces are spaced apart in an unloaded condition, said spacing decreasing with increasing electromagnetic force;

said hydrostatic transmission comprising a pump, and a motor, and a pair of hydraulic system lines interconnecting said pump and said motor in a closed loop, such that a system pressure is generated in each of said lines during the operation of said hydrostatic transmission, said system pressures being proportional to the output torque generated by said hydrostatic transmission;

a sensing means for sensing hydrostatic transmission system pressures and generating signals representative of said;

an electronic control means for receiving said system pressure signals, comparing said signals to predetermined values, supplying current to said clutch for adjusting the magnetic force on said clutch disks when said predetermined values are exceeded; and whereby when said pressure exceeds a predetermined value said electronic control varies the current and thereby the magnetic force on said clutch disks to provide variable at said torque rear axle based on hydrostatic transmission system pressure.

12. The steerable rear axle of claim 11 wherein said sensing means is a pressure transducer operatively connected to at least one of said system lines.

13. The steerable rear axle of claim 11 wherein said system pressures are sensed and a differential between said pressures is determined by said sensing means and a signal representative of said differential is sent to said control for comparison to said predetermined.

14. The steerable rear axle of claim 11 wherein said clutch disks are preloaded in engagement by one or more coiled springs.

* * * * *